United States Patent [19]

Hara et al.

[11] 3,913,856

[45] Oct. 21, 1975

[54] ENDLESS TAPE TRANSPORTING DEVICE

[75] Inventors: Satoshi Hara, Kanagawa; Morio Akino, Fujisawa; Keizo Nakagawa, Chigasaki, all of Japan

[73] Assignee: Tokyo Shibaura Electric Co., Ltd., Kawasaki, Japan

[22] Filed: Sept. 18, 1973

[21] Appl. No.: 398,394

[30] Foreign Application Priority Data

Sept. 22, 1972 Japan .............................. 47-95590

[52] U.S. Cl. .......................................... 242/55.19 A
[51] Int. Cl.² .................... G11B 23/08; B65H 17/48
[58] Field of Search ............. 242/55.19 R, 55.19 A; 352/128

[56] References Cited

UNITED STATES PATENTS

| | | | |
|---|---|---|---|
| 2,177,505 | 10/1939 | Van Der Schalie | 242/55.19 R |
| 2,285,070 | 6/1942 | Weber | 242/55.19 R |
| 2,918,536 | 12/1959 | Appert et al. | 242/55.19 A X |
| 2,951,654 | 9/1960 | Steelman | 242/55.19 A |
| 2,964,256 | 12/1960 | Gorey | 242/55.19 A |
| 3,155,335 | 11/1964 | Maeder | 242/55.19 A |
| 3,241,781 | 3/1966 | Knox | 242/55.19 A |
| 3,245,630 | 4/1966 | Morris et al. | 242/55.19 A |
| 3,295,782 | 1/1967 | Stark et al. | 242/55.19 A |

*Primary Examiner*—Billy S. Taylor
*Attorney, Agent, or Firm*—Oblon, Fisher, Spivak, McClelland & Maier

[57] ABSTRACT

An endless tape transporting device provided with a reel which has a flange radially projecting an extent of 0.5 to 2.0 mm from the lower side peripheral edge of the reel. Radially extending rollers are also provided in conjunction with the reel and flange for supporting the outermost portion of the tape coil while the flange supports the innermost portion of the tape coil and in this manner transport feeding of the tape from the innermost portion of the coil is facilitated while uniform winding of the same upon the outermost portion of the coil is likewise faciliated.

3 Claims, 4 Drawing Figures

ENDLESS TAPE TRANSPORTING DEVICE

This invention relates to an endless tape transporting device and particularly, but not excludingly, such a device applicable to a magnetic tape recording/reproducing apparatus.

With the conventional endless tape transporting device a tape is wound around and delivered from an annular groove V-shaped in cross section which is provided in the periperal side portion of a reel, and the tape coiled into a laminated coil is supported on supporting rolls. 60° 45°

A magnetic tape recording/reproducing apparatus using an endless tape distortion widely utilized for recording and reproducing aural signal. However, the use of video signal for this purpose is not yet realized. A signal of a very high frequency is used, when compared with aural signal, in recording and reproducing video signal. With an endless tape transporting device in which a tape is travelled with a head fixed therefor is required that the tape be travelled at a high speed of more than 3 m/sec. With the video signal recording and reproducing device, the irregular travelling of a tape produces "jitters" such as the wavering or distrotion of a reproducing image, thus failing in obtaining a stable and reliable reproducing image. Therefore, the stable travelling speed of the tape as well as the uniform winding of the tape should be assured.

With the conventional tape transporting device, when a tape is travelled at a high speed, a friction occurs if the tape is not smoothly withdrawn from a reel, thus making the tape travelling unstable. Furthermore, the tape so withdrawn is firmly wound around the reel to cause its travelling speed to be appreciably varied. In the worst case, it is impossible to withdraw the tape from the reel.

By the inclination of a V-shaped groove of the reel and the variation of a tape speed, a tape enters into a clearance between the reel and the supporting rolls, resulting in an unstable tape travelling. In the end, the tape creeps the reel, rendering the rotation of the reel impossible. Various attempts have been made to realize the stable travelling at a high speed of an endless tape, but with no sufficient result.

An object of this invention is to provide an endless tape transporting device which, even when the tape moves at a high speed, is capable of uniformly taking up the tape on a reel and permitting its stable travel.

According to this invention there is provided a device for transporting an endless tape comprising a supporting rod, a reel rotatable mounted on the rod and having in its peripheral side surface an annular groove V-shaped in cross section, said reel holding the tape on its peripheral side in the form of a laminated coil to permit the tape to be wound on the outermost of said coil and delivered from the innermost thereof through said annular groove, a flange projecting an extent of 0.5 to 2.0 mm radially from the lower side peripheral edge of the reel, and supporting means for supporting the lower side portion of the laminated coil on its peripheral wall.

By a suitable friction between the flange and the tape portion of the inner layer of a laminated coil a tape is loosely wound on the reel and smoothly delivered from the innermost of the laminated coil, thus assuring its stable travel.

Where a flange projection does not reach 0.5 mm, a driving force by the tape is not sufficiently imparted to the reel and the tape is firmly wound on the reel as in the case of a reel having no such a flange. Where the flange projection exceeds 2.0 mm, the reel is rotated at the same speed as that of the tape. However, the -speed of the outer peripheral edge portion of the flange is quicker than the travelling speed of the tape. As a result, that tape portion engaged with the outer peripheral edge portion of the flange is moved at a quicker speed than a predetermined tape travelling speed to cause the laminated coil to be loosened to a greater extent, that is to cause the laminated coil to be extended radially outwardly. Where the flange projects an extent of 2.0 mm or less as in this invention, a difference between the running speed of the tape portion adjacent to the outer peripheral edge portion of the flange and the predetermined running speed of the tape can be disregarded and there is involved no such slacking.

The supporting means may have at least one supporting roll, and it is desirable that a spacing between the outer peripheral edge portion and the supporting roll be of the order of 2.0 mm or less. At this value, the tape is supported on the supporting roll without involving a drop of the tape between the flange and the roll. When the spacing exceeds this value, the tape is dropped below the reel, thus preventing the rotation of the reel.

The flange is preferably made of such a hard material as a stainless steel which is relatively small in friction against the tape and does not suffer any damage from the side edge portion of the tape.

The supporting roll may be constructed as an idler roll freely rotatable by the laminated coil. Alternatively the supporting roll can be rotated, through a transmission roll engaged with the lower surface of the reel, at the same speed as, or somewhat a slower speed than, that of the tape. The supporting roll supports the laminated coil as well as imparts a suitable tension to the tape, thereby preventing an outward extension of the laminated coil.

This invention can be more fully understood from the following detailed description when taken in connection with reference to the accompanying drawings, in which.

Figure 1:
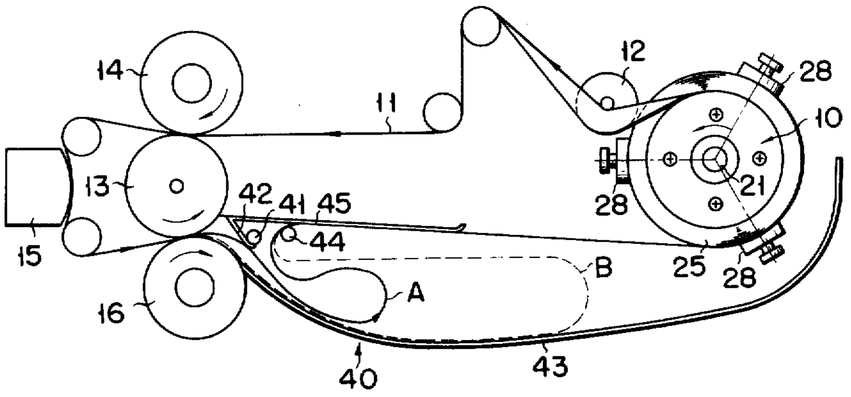
FIG. 1 is a plan view showing a recording/reproducing apparatus provided with an endless tape transporting device according to this invention.

A magnetic tape recording/reproducing apparatus as shown in FIG. 1 is provided with a reel 10 for winding and delivering an endless tape. The tape delivered from the reel is fed through a conical guide roll 12 and nip between a capstan 13 and pinch roll 14 to a head 15, and then passed through a nip between the capstan and pinch roller 16 where it is fed towards a loop buffer mechanism 40. Then it is passed through the mechanism 40 and wound on the reel 10. The tape is constantly travelled through the nip between the capstan and the pinch roller at a high speed of more than 3 m/sec.

The mechanism 40 has first, second and third guides. The first guide comprises a guide pole 41 and a guide plate 42 which are provided in a travellling direction of the tape 11 delivered from the nip between the capstan 13 and the pinch roller 16.

The second guide includes a guide plate 43 extending from the neighborhood of the pinch roller 16 up to the neighborhood of the reel 10 in a manner to describe a gentle curve.

The third guide comprises a guide pole 44 and a guide plate 45 provided in proximity to the first guide and on the side of the reel.

The first guide serves to guide onto the guide plate 42 the tape 11 withdrawn from between the capstan 13 and the pinch roller 16 to cause to change its direction to permit it to be travelled in a direction of the rotation of the pinch roller 16. Then, the tape 11 from the first guide is brought into an engagement with the second guide to cause it to be guided towards the reel 10. The third guide causes the tape 11 so travelled to turn back halfway so that substantially one loop is created, and then causes it to be passed between the guide pole 44 and the guide plate 45 to permit it to be travelled straight towards the reel 10.

When the endless tape transporting device is situated at its initial slow speed, a slack tape assumes a form as shown by A (FIG. 1). When the device is normally operated, the tape 12 trapped within the loop buffer mechanism assumes a larger form as shown by B in FIG. 1. In this way, the slack portion of the tape 12 is varied depending upon the operating conditions. Since the tape 12 is guided by the second and third guides to provide a loop, it is not freely meandered or vibrated within the loop buffer mechanism as encountered in the conventional device. The tape 11, after passed between the guide pole 44 and the guide plate 45, is guided along the guide plate 45 and wound on the reel 10. Therefore, the tape 11 is not meandered or vibrated in a space between the third guide and the reel 10.

Figure 2:
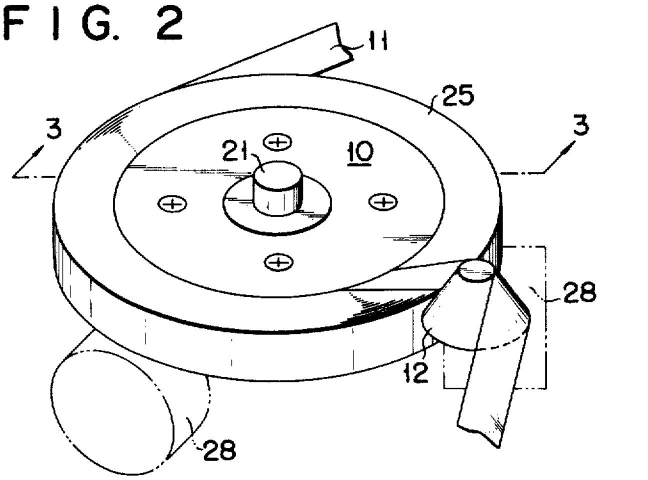
FIG. 2 is an enlarged, perspective view showing the device of FIG. 1.
Figure 3:
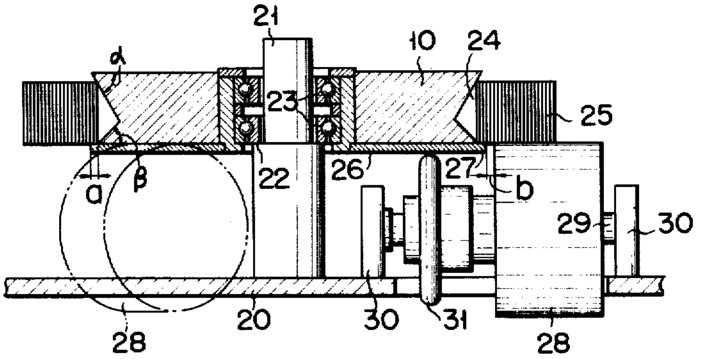
FIG. 3 is a cross sectional view taken along line 3—3 of FIG. 2.

In Figs. 2 and 3 the endless tape transporting device according to this invention is shown in detail. The reel 10 is detachably fitted over a supporting rod 21 upright from the base 20 of the magnetic tape recording/reproducing apparatus. The reel is positioned in an axial direction by the stepped portion 22 of the supporting rod. The reel 10 has a pair of ball bearings 23 fitted over the supporting rod to permit a free rotation relative to the supporting rod.

In the peripheral side surface of the reel is provided an annular groove 24 V-shaped in cross section. The tape is coiled around the peripheral side surface of the reel to provide the laminated coil 25. The tape is delivered from the innermost of the laminated coil through the groove 24 and wound on the outermost of the laminated coil.

To the lower side suraface of the reel, a disk 26 made of a hard material such as a stainless steel exhibiting a small friction is secured. The outer peripheral portion of the disk radially projects a radial extent of $a$=0.5 to 2 mm from the lower side peripheral edge portion of the reel to provide a flange 27.

The under surface of the laminated coil 25 is supported by supporting rolls 28 made of a suitable friction material such as rubber. In this embodiment three rolls are equiangularly spaced from each other as shown in FIG. 1. The top of the peripheral wall of the supporting roll is flush with the top surface of the flange 27. The inner end surface of the supporting roll is spaced a distance of *b*   2.00 mm from the outer periphery of the flange.

The supporting roll 28 is fixed to a shaft 29 having a central axis orthogonal to the supporting rod 21. The both ends of the shaft are rotatably journaled in a pair of bearing members 30 mounted to the base 20. On a shaft 29 a transmission roll 31 engaging on the under surface of the reel 10 is coaxially mounted so as to rotate the supporting roll. The diameter of the supporting roll, the diameter of the transmission roll and the engaging position of the transmission roll relative to the reel are suitably selected so that the peripheral speed of the supporting roll is made equal to, or a little slower than, the travelling speed of the tape.

Figure 4:
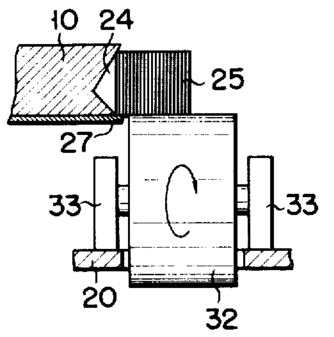
FIG. 4 is a partial view showing a modification of a supporting roll.

FIG. 4 shows a modification of the supporting roll. In this modification the supporting roll is formed as an idle roll 32 supported by a pair of bearing members 33 and is directly rotated by a tape.

When an endless tape 11 is travelled through the nip between the capstan 13 and the pinch roller at a high speed of more than 3 m/sec. the reel 10 is rotated by engagement of the tape with the inner wall of the V-shaped groove 24 and the flange 27. At this time, the peripheral speed of the reel is made equal to the travelling speed of the tape and the laminated coil does not extend outwardly. Thus, the tape is stably travelled and wound uniformly on the reel. It was established that the radial extent 0.5 to 2.0 mm of the flange can attain such effect irrespective of the diameter of the reel.

The smaller the distance b between the flange 27 and the supporting roll 28, the better. It was found that when the distance b is up to the extent of 2.0 mm the tape can be stably travelled without suffering any bad effect. However, when the distance *b* exceeds 2.0 mm, the tape creeps from between the flange and the roll to below the reel, making the winding operation unstable. In the worst case, there is a risk that the rotation of the reel can not be made.

Since the top surface of the flange 27 is flush with the top of the supporting roll 28, the tape is smoothly moved from the roll to the flange, assuring a smooth winding of the tape.

With this embodiment, the width of the tape is 12.5 mm; the diameter of the upper side portion of the reel 70.0 mm; the thickness of the reel body 15.0 mm; the thickness of the flange 1.0 mm; the upper inclination $\alpha$ of the V-shaped groove 60° and the lower inclination $\beta$ of the V-shaped groove    °. However, these dimension should not be restrictively taken, but may be varied depending upon all the operating conditions such as the width, whole length, travelling speed etc. of the tape.

With this embodiment explanation is made of the magnetic endless tape and its transporting device. However, this invention should not be restricted to them. This invention is applicable to a system of recording a signal as a groove on a tape such as synthetic resin etc., – as is found in a record – or a system of recording a shade of signals on a tape and photoelectrically reproducing it.

What we claim is:

1. A device for transporting an eldless tape comprising:

means for transporting said tape at a speed of more than 3 m/sec;

a supporting rod;

a reel rotatably mounted upon said rod and having within its peripheral side surface an annular groove V-shaped in cross-section, said reel holding said tape within said peripheral side in the form of a laminated coil so as to permit said tape to be wound upon the outer most portion of said coil and delivered from the inner most portion thereof through said annular groove;

supporting means for supporting the lower side portion of said laiminated coil, said supporting means including a flange fixed to said reel and projecting radially from the lower side peripheral edge of said reel for a distance of from 0.5 — 2.0 mm and at least one supporting roll being spaced a distance of less than 2.0 mm from the peripheral edge portion of the flange and having its axis extending in the radial direction of said reel and being in the form of a cylinder of uniform diameter; and said supporting roll being provided with a transmission roll having its periphery engaging the lower side surface of the reel so as to rotate said supporting roll at a speed not greater than the tape traveling speed.

2. An endless tape transporting device according to claim 1, wherein said flange is made of stainless steel.

3. An endless tape transporting device according to claim 1, wherein said supporting roll is made of rubber.

* * * * *